US009758702B2

(12) United States Patent
Kristiansen et al.

(10) Patent No.: US 9,758,702 B2
(45) Date of Patent: Sep. 12, 2017

(54) ISOTROPIC CONDUCTIVE ADHESIVE

(71) Applicant: Conpart AS, Skjetten (NO)

(72) Inventors: Helge Kristiansen, Skjetten (NO); Keith Redford, Skjetten (NO); Tore Helland, Skjetten (NO)

(73) Assignee: CONPART AS, Oslo (NO)

( * ) Notice: Subject to any disclaimer, the term of this patent is extended or adjusted under 35 U.S.C. 154(b) by 0 days.

(21) Appl. No.: 13/904,244

(22) Filed: May 29, 2013

(65) Prior Publication Data

US 2013/0323501 A1 Dec. 5, 2013

Related U.S. Application Data

(60) Provisional application No. 61/652,524, filed on May 29, 2012.

(30) Foreign Application Priority Data

May 29, 2012 (GB) .................................... 1209486.8
Mar. 13, 2013 (GB) .................................... 1304532.3

(51) Int. Cl.
*C09J 9/02* (2006.01)
*C08K 9/10* (2006.01)
*H01B 1/22* (2006.01)
*H01R 4/04* (2006.01)

(52) U.S. Cl.
CPC ........ *C09J 9/02* (2013.01); *C08K 9/10* (2013.01); *H01B 1/22* (2013.01); *H01R 4/04* (2013.01); *Y10T 428/249921* (2015.04); *Y10T 428/254* (2015.01)

(58) Field of Classification Search
CPC ... C09J 9/02; C09J 11/08; C09J 163/00; C09J 2400/22; C08K 9/10
USPC ......................................................... 523/204
See application file for complete search history.

(56) References Cited

U.S. PATENT DOCUMENTS

| | | | |
|---|---|---|---|
| 4,731,282 A | 3/1988 | Tsukagoshi et al. | |
| 4,740,657 A * | 4/1988 | Tsukagoshi et al. | ........ 174/88 R |
| 5,120,665 A | 6/1992 | Tsukagoshi et al. | |
| 6,787,233 B1 * | 9/2004 | Molteberg et al. | ........... 428/403 |
| 6,942,824 B1 | 9/2005 | Li | |
| 2001/0028953 A1 * | 10/2001 | Bluem | ....................... C09J 4/00 |
| | | | 428/355 AC |
| 2007/0007344 A1 | 1/2007 | Inoue et al. | |
| 2007/0269603 A1 | 11/2007 | Kubota | |
| 2012/0313056 A1 | 12/2012 | Baran et al. | |
| 2013/0248777 A1 | 9/2013 | Sgriccia et al. | |
| 2013/0277623 A1 * | 10/2013 | Redford et al. | ............. 252/513 |

FOREIGN PATENT DOCUMENTS

| | | |
|---|---|---|
| EP | 0242025 | 10/1987 |
| EP | 1783783 | 5/2007 |
| EP | 2632975 | 9/2013 |
| WO | 0024005 | 4/2000 |
| WO | 2012056244 | 5/2012 |
| WO | 2013041568 | 3/2013 |

OTHER PUBLICATIONS

International Search Report and Written Opinion for PCT/EP2013/061091 dated Oct. 24, 2013, 7 pages.
Search Report for Application No. GB1309566.6 dated Dec. 10, 2013, 4 pages.
Excerpts of J.J. Licari and D.W. Swanson, "Adhesive Technology for Electronic Applications: Materials Process Reliability" (William Andrew Publishing 2005), available at https://books.google.co.uk/books?hl=uklr=&id=ZZ5kEWU5aHoC&oi=fnd&pg=PP1&dq=Adhesive+technology+for+electronic+applications:+Materials+process+reliability+J.J.+Licari+and+D.W. <https://protect-us.mimecast.com/s/EJq7B0sDDKRin>, 2011.
J.E. Morris in Chapter 4 of "Advanced Adhesives in Electronics: Materials, Properties and Applications," Edited by M. O. Alam and C. Bailey, Woodhead Publishing Limited, 2011.
J.E. Morris & J. Liu "Electrically Conductive Adhesives", Chapter 20 Micro- and Opti-Electronic Materials and Structures: Physics, Mechanics . . . E. Suhir, Y.C. Lee and C.P. Wong (Springer 2007).
Myung Jin Yim, Yi Li, Kyoung-sik Moon, KyungWook Paik and C. P. Wong "Review of Recent Advances in Electrically Conductive Adhesive Materials and Technologies in Electronic Packaging" J. if Adhesion Science and Technology 22 1593-1630 (2008).
Daoqiang Lu, Quinn K. Tong, and C. P. Wong "Conductivity Mechanisms of Isotropic Conductive Adhesives (ICA's)" IEEE Transactions on Electronics Packaging Manufacturing, vol. 22, No. 3 (Jul. 1999).
Byung-Seung Yim and Jong-Min Kim, "Characteristics of Isotropically Conductive Adhesive (ICA) Filled with Carbon Nanotubes (CNTs) and Low-Melting-Point Alloy Fillers" The Japan Institute of Metals, Materials Transactions, vol. 51, No. 12 pp. 2329 to 2331 (2010).
Jong-Min Kim, Kiyokazu Yasuda, Masahiro Rito and Kozo Fujimoto "New Electrically Conductive Adhesives Filled with Low-Melting-Point Alloy Fillers" The Japan Institute of Metals, Materials Transactions, vol. 45, No. 1, pp. 157 to 160 (2004).
James E. Morris "Isotropic Conductive Adhesives: Future Trends, Possibilities and Risks" IEEE Polytronic 2005 Conference, Department of Electrical & Computer Engineering, Portland State University (2005).
"Design Optimization of Isotropic Conductive Adhesive Interconnects in Flexible Electronics", Thijs van Loon (May 2011).
Yazici et al., "Particulate Based Conductive Composites Exploiting Percolation-Range Microstructure"—p. 1551 of Society of Plastics Engineers, Inc. / ANTEC 1999 Conference Proceedings (Society of Plastics Engineers Annual Technical Conference and Exhibit// Antec), NYC, ISBN 1-56676-804-7 (May 2-6, 1999).

(Continued)

*Primary Examiner* — Vickey Nerangis
(74) *Attorney, Agent, or Firm* — Banner & Witcoff, Ltd.

(57) ABSTRACT

An isotropic conductive adhesive having silver coated polymer beads within an adhesive matrix and a method of forming an isotropic conductive adhesive are disclosed. The mean average diameter of the polymer cores of the beads is less than 30 μm, and the silver coating comprises interlinked silver deposits grown from dispersed nucleation sites scattered across the surface of the beads.

18 Claims, 1 Drawing Sheet

(56) References Cited

OTHER PUBLICATIONS

Gakkestad et al., "Use of Conductive Adhesive for MEMS Interconnection in Ammunition Fuze Applications," J. Micro/Nanolith, MEMS MOEMS, vol. 9(4), 041108 (Oct.-Dec. 2010).

Nguyen-H. V. Nguyen, H. Kristiansen, J. Gakkestad, R. Johannessen, N. Hoivik and K. E. Aasmundtveit, "Spherical polymer particles in isotropic conductive adhesives a study on rheology and mechanical aspects," 3rd Electronics System Integration Technology Conference ESTC, Berlin, pp. 1-6 (2010).

Alam et al. "Advanced Adhesives in Electronics—Materials, Properties and Applications," Woodhead Publishing Limited, 2011.

Halaciuga et al., "Metal Coated Polymer Particles for Electronic Packaging," I. Halaciuga, Keith Redford, Dan V. Goia (2010), IMAPS, International Symposium on Microelectronics: Fall 2010, vol. 2010, No. 1, pp. 000066-000071 (2010).

Gakkestad, et al., "Conductive Adhesives Increase Microchip Packaging Density," SPIE, Newsroom 10.1117/2.1200912.002521, 2009.

* cited by examiner

ISOTROPIC CONDUCTIVE ADHESIVE

This application claims priority to and is a continuation-in-part of U.S. Provisional Application No. 61/652,524, filed on May 29, 2012. This application also claims priority to GB1209486.8 filed May 29, 2012 and GB1304532.3 filed Mar. 13, 2013. U.S. Provisional Application No. 61/652,524, GB1209486.8, and GB1304532.3 are all incorporated by reference in their entireties.

FIELD

The invention relates to an isotropic conductive adhesive and a method of manufacture thereof.

BACKGROUND

Isotropic conductive adhesives (ICAs) have been commercially available as an alternative to solder interconnects in electronic packaging for many years. An ICA typically consists of a non-conductive adhesive matrix filled with conductive particles. The mechanical strength of the ICA comes from the adhesive matrix, while the conductive fillers provide electrical conductivity.

The most common ICAs in the electronics industry consist of epoxy filled with silver flakes or particles. FIG. 1 is a schematic drawing showing an ICA of this type used to connect a component 2 to a substrate 4. Both of the component 2 and substrate 4 have an electrical contact 6. The ICA, which comprises a polymer resin matrix 8 and silver flakes 10 is used to electrically connect the two contacts 6. The silver flakes 10 form a conductive network that allows for conduction of electricity in all directions. Before the adhesive is cured, the silver flakes (in the adhesives) have a tendency to be oriented both during application and under the influence of gravity. This results in a better conductivity in the plane of the substrate compared to conductivity normal to this plane and hence the conductive properties of the adhesive are not truly isotropic. Traditionally, ICA compounds have been heavily loaded with silver particles, typically in the range of 25-30 volume % (up to 80 wt %), to ensure sufficient electrical conductivity also in the z-direction. This leads to a high metal content for the adhesive. Such a high metal particle loading causes significant changes in the mechanical properties of the adhesives, including increased bulk modulus, reduced flexibility (a more brittle response) and an excessive use of precious metal.

Metal coated glass beads have also been proposed as the filler in ICAs. However the use of glass beads creates a mismatch in thermal coefficient of the bead with the epoxy matrix and this results in degradation and loss of conductivity when the adhesive undergoes thermal cycling. In addition, the rigidity of the glass beads and difficulties in generating tightly controlled size distribution for the particles results in limited contact areas with the surfaces that are adhered together, further limiting conductivity.

U.S. Pat. No. 6,942,824 discloses an electrically conductive adhesive including a resin component, a photoinitiator, and metal-coated polymer beads. The resin is UV cured. The metal coating of the beads provides electrical conductivity. The use of polymer beads avoids some of the disadvantages associated with glass beads. The polymer beads are between 15 and 30 µm in diameter and are coated with gold or silver having a thickness of between 20 and 100 nm. The metal layer is a uniform coating formed by 'polymer bead shell metal plating', which is disclosed as comprising the formation of a uniform copper layer followed by plating with an additional layer, or by electroplating, which typically involves the use of a continuous nickel seed layer followed by a gold or silver layer. The use of nickel may not be desirable as it is classified as Carcinogenic 2B (possible carcinogen for humans) and is related to skin sensitisation and allergies.

SUMMARY

Viewed from one exemplary aspect, the invention can include an isotropic conductive adhesive comprising silver coated polymer beads within an adhesive matrix, wherein the mean average diameter of the polymer cores of the beads is less than 30 µm and wherein the silver coating comprises interlinked silver deposits grown from dispersed nucleation sites scattered across the surface of the beads.

BRIEF DESCRIPTION OF THE DRAWINGS

Certain exemplary embodiments will now be described by way of example only and with reference to the accompanying drawings in which.

DETAILED DESCRIPTION

Figure 1:
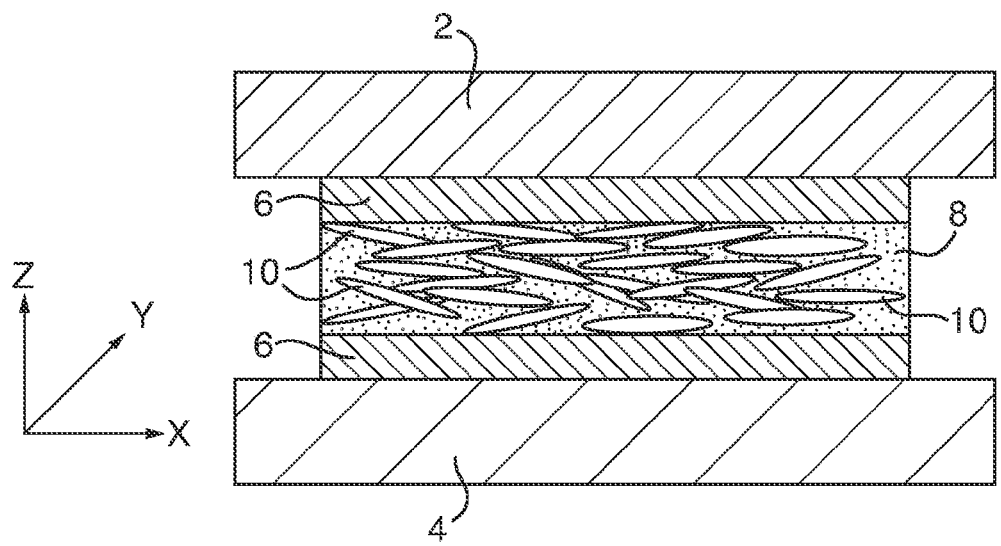
FIG. 1 is a schematic drawing showing a conventional isotropic conductive adhesive using silver flakes.

An exemplary embodiment may include an isotropic conductive adhesive comprising silver coated polymer beads within an adhesive matrix, wherein the mean average diameter of the polymer cores of the beads is less than 30 µm and wherein the silver coating comprises interlinked silver deposits grown from dispersed nucleation sites scattered across the surface of the beads.

The polymer beads are spherical or close to spherical balls of polymer. Polymer beads of the sizes used herein are often referred to as micro-beads or micro-spheres. The use of silver coated polymer beads offers improvements over silver particles and metal coated glass beads. Less metal and fewer processes may be required to provide the required conductivity and compared to glass beads the polymer beads can be more closely matched in terms of mechanical properties to the properties of the surrounding adhesive matrix, including thermal expansion coefficient and elastic deformation. This minimises degradation in the adhesive that would otherwise occur under cycling thermal or mechanical loads.

As noted above, U.S. Pat. No. 6,942,824 discloses the use of polymer beads. However, the silver or gold coating for the polymer beads of U.S. Pat. No. 6,942,824 is created as a uniform layer. In order to deposit this uniform layer a continuous seed layer of copper or nickel is used. Growing a conductive layer of silver using nucleation sites on the surface of the beads advantageously uses less metal and fewer manufacturing steps than the processes disclosed in U.S. Pat. No. 6,942,824. Surprisingly, it has been found that silver deposits will readily grow on the surface of the beads using nucleation sites and that when the individual deposits become large enough to interlink then the conductive properties of an adhesive utilising the beads are comparable to conventional isotropic conductive adhesives. The absence of the seed layer also results in a metal layer that is thinner (for a comparable thickness of silver). This can have advantages in terms of the mechanical properties of the beads, in particular when the seed layer is made of nickel which is a very hard and little compliant metal. The mechanical properties of the polymer core will be more dominant in a bead having a thinner coating allowing the properties of the beads to be more closely matched with the properties of the surrounding adhesive matrix. The absence of the continuous seed layer also has advantages related to the density of the filler. A conductive filler with only a single metal layer can have a density closer to that of the resin and as such have a reduced tendency to sedimentation/separation.

A mean average diameter of the polymer cores of the beads of less than 30 μm (excluding 30 μm) is used since the use of beads with larger diameters may have certain disadvantages. The disadvantages may include reduced conductivity, the need for a thicker bond line and reduced strength of the bonded adhesive. The reduced conductivity is as a consequence of the increased proportion of polymer core in the adhesive compared to the amount of silver. The bond line thickness is the thickness of adhesive required between the two parts that are joined together. For a conductive adhesive the required thickness needs to take the need for conductivity into account as well as the bond strength. When larger beads are used the bond line thickness is increased, which can be a disadvantage. Flexible electronics is an area where bond line thickness can be critical. A thick bond line can act as a core between the flexible sheet and the flexible component stiffening the structure. Continuous shrinking of microelectronic components also creates an interest for reducing the bond line thickness. Also, the use of larger beads leads to reduced shear strength for the bonded adhesive. It should be understood that the use of larger beads is possible, but it may not be preferred in certain applications.

The mean average diameter of the polymer cores of the beads can be 25 μm or lower, or 20 μm or lower. Reducing the mean average diameter provides increased conductivity and strength for the adhesive, and permits a thinner bond line.

In certain exemplary embodiments the mean average diameter of the polymer cores of the beads is 2 μm or more, more than 2 μm, or above 6 μm, and optionally 10 μm or above. As the polymer beads are made smaller the relative amount of silver increases since the surface area of the beads increases comparative to the volume of the beads. An adhesive product using smaller sized beads will include a higher proportion of silver than the equivalent product using larger sized beads and the same silver thickness. While smaller sized beads may have advantages in relation to conductivity when the size of the beads is too small these advantages may not be sufficient to outweigh the disadvantage of increased silver use and the consequent increased manufacturing cost. Hence a minimum average diameter may be a preferred feature.

In another exemplary embodiment the polymer cores of the beads have a mean average diameter of between 6 μm and less than 30 μm, optionally excluding 6 μm, between 10 μm and 25 μm, optionally excluding the end points of this range, or between 10 μm and 20 μm, optionally excluding the end points of this range. These ranges of average sizes are considered to provide the best compromise between the amount of silver required to create the necessary interlinked deposits whilst also keeping the beads small enough to provide the capability for a thinner bond line, higher conductivity and good mechanical properties for the cured adhesive. It will be understood that when selecting the mean average diameter for the polymer beads there are compromises between conductivity, mechanical properties and the amount of silver used. It has been found that good combinations of conductive and mechanical properties can be achieved with the use of beads having the average diameters set out above.

The references to mean average diameter herein are references to a mean diameter of the polymer cores of the beads prior to coating with silver as measured by an instrument such as a Coulter Counter, by microscopy or by an equivalent technique.

In certain exemplary embodiments the polymer cores of the beads may all have a coefficient of variation (CV) in diameter of less than 10%, less than 5%, less than 4%, or less than 3%. The CV value is defined by: CV=Standard deviation in diameter/Mean average diameter. It also may be preferred to avoid "off size" particles with a diameter far from the average. Hence, the incidence of polymer cores of the beads with a diameter less than two thirds of the mean diameter or with a diameter greater than 1.5 times the mean diameter should be less than 1 in 1000 or less than 1 in 10 000. It is known that a broad size distribution of spherical particles increases the percolation threshold. (See, for example, R. Yazici et. al, "Particulate based conductive composites exploiting percolation-range microstructure", http://www.hfmi.stevens.edu/publications/147.PDF). Again, a broad size distribution will increase the consumption of silver to provide the same conductivity.

A smaller CV of the beads, in particular an absence of "off size" particles has been found to be particularly advantageous for an isotropic conductive adhesive since the beads in the isotropic adhesive can pack together with contact in several directions through the adhesive. This advantageous close packing is promoted when the diameters of the beads are within the ranges set out above.

Appropriate polymer particles for the polymer cores of the beads can be obtained from various companies including Conpart AS of Norway.

The thickness of the silver layer can also be beneficial. Larger thicknesses will use a greater amount of silver and will also have a more significant effect on the mechanical properties of the sphere. However the larger thickness will improve electrical conductivity and can also have advantages for thermal conductivity. Conversely, when the silver layer is thinner then the silver usage and conductivity is reduced, but the mechanical properties of the coated polymer bead are influenced more by the polymer core. It may be advantageous for the mechanical properties to be influenced by the polymer core rather than by the silver coating since the mechanical properties of the polymer core can more closely match the mechanical properties of the adhesive matrix. In order for the adhesive to operate as intended, the amount of silver and the extent of the silver coating should be sufficient to produce a low resistance metal layer around the polymer core. In addition, the volume fraction of the beads must be sufficient to form an interconnected conductive network in the adhesive matrix It will be understood that with the use of interlinked deposits grown from dispersed nucleation sites then the silver may grow outwardly from the surface of the polymer as well as growing along the surface starting from the nucleation site. This means that the thickness of the silver coating is not constant. When an average coating thickness is referenced herein it refers to a mean average thickness of the silver as determined, for example, by a density measurement using a pycnometer or similar device. A suitable instrument is the Multipycnometer manufactured by Quantathrome Instruments of Boynton Beach, Fla., USA.

To determine the amount of silver for present and to hence allow calculation of an average coating thickness using a density measurement technique first the volume of a measured weighted sample of beads comprising the pure polymer core is measured and the density of the polymer core is calculated. The volume and density measurement is then repeated for a measured weight sample of beads with the addition of the silver coating on the polymer core, with beads taken from the same polymer core batch as the pure polymer core sample. The volume of silver relative to the volume of the polymer core material can then calculated based on the differences in volume and density. An average silver thickness indicating a mean average thickness for the silver coating across the entire surface area of each bead can be determined from this using the mean average diameter of the beads. For particles with a broad size distribution it is important that the value for the average diameter used in the calculation is defined as the square root of an average of the square of the diameter, as in the formula below:

$$\text{Area weighted average diameter} = \sqrt[2]{\left(\frac{\sum_{1}^{n} d^2}{n}\right)}$$

where d represents the measured diameter of individual particles and n represents the number of particles measured. This gives an average based on the surface area of the particles—not an average diameter. If the particles are identical in size then the average diameter and area weighted average become the same.

The amount of silver in the silver coating derived from this measurement technique can be expressed as an absolute thickness or alternatively it can be expressed as a volume of silver relative to the volume of the coated particles. Defining the thickness based on a relative volume of silver, for example as a volume percentage (vol %), gives a measure of the silver thickness that is independent of the mean average diameter. The vol % of silver in the coated particles is of course directly related to the thickness when expressed as a percentage of the core diameter.

The average thickness of the silver measured in this way may be 350 nm or less and/or less than 4% of the core diameter, less than 3.5% of the core diameter, less than 3% of the core diameter, and optionally less than 1.7% of the core diameter. If expressed as a vol % of silver in the coated particles then a thickness of less than 3% of the core diameter equates to a maximum of about 16.9 vol % of silver in the coated particles. The maximum permitted thickness may be the larger of 350 nm and the percentage values set out above. For smaller diameters an average thickness of more than the percentage values can be tolerated and it can be advantageous in terms of conductivity to permit a higher maximum. It has been found that the disadvantages of coatings with average thickness above these values may outweigh the advantages. With thicker silver coatings the mechanical properties of the coated polymer beads can be dominated by the metal coating and as noted above it may be preferred for the properties to be more heavily influenced by the polymer core. Also, as the coating becomes thicker the disadvantage of increased costs for the additional silver can outweigh any benefits from increased conductivity. However, it may be that for certain applications, where thermal conductivity is a significant advantage, then larger thicknesses than those stated above could be useful. For applications requiring high levels of thermal conductivity the use of particles at the lower end of the size ranges set out above may also be preferred.

It may be desired for the average thickness of the silver coating to be more than 0.5% of the core diameter, more than 0.7% of the core diameter, and optionally more than 0.85% of the core diameter. These levels of silver are expected to provide good conductivity while also minimising material costs and limiting the effect of the coating on the mechanical properties of the beads. Alternatively, the average thickness of the silver may be more than 25 nm, more than 50 nm, or more than 100 nm. The minimum average thickness for the coating may be set as the smaller out of one of these values and one of the percentage values above. For larger diameters an average thickness of less than the percentage values above can be tolerated and thicknesses over these values can provide sufficient conductivity even at the larger diameters. A value of 50 nm with core diameters of 20 µm to 25 µm gives a thickness of 0.25% to 0.2% of the diameter. Some exemplary embodiments use a thickness of more than 120 nm for enhanced conductivity.

In some exemplary embodiments, the average diameter of the polymer cores of the beads is between 6 µm and less than 30 µm, optionally excluding 6 µm, or between 10 µm and 20 µm, optionally excluding the end points of this range; and the average thickness of the coating, measured as above, is above 50 nm and below 350 nm, above 100 nm, below 200 nm; and/or with an average thickness of between 0.7% and 3% of the core diameter. These combinations of thickness and diameter values have been found to give particularly good results.

Full coverage of the particle with silver is not a prerequisite for the functionality of the product. It may however be preferred that the coverage be more than 80% of the particle surface area or complete coverage. This may lead to the best conductive properties for the adhesive.

Silver may be deposited on small polymer particles by a number of methods. The most applicable are the methods collectively called electroless-plating. Electro-plating is also theoretically possible but extremely difficult on such small particles. Electroless-plating of silver on a polymer requires activation of the surface. In an example coating process, catalytic quantities of metals atoms illustrated by but not restricted to palladium, platinum or silver are distributed evenly over the surface of the polymer core. This may be achieved by methods including vapour deposition, impregnation with a salt of the metal followed by reduction to the metallic state or by sensitisation by acidic tin chloride followed by a salt such as palladium chloride. The methods are numerous and well known to one skilled in the art. Silver may then be deposited by the reduction of silver ions from a soluble salt such as silver nitrate or silver sulphate. This reaction may be performed with a number of reducing agents illustrated by but not restricted to hydrazine, dimethyl ammonium borane, sugars such as glucose and fructose or ascorbic acid. In this example process silver deposition is initially catalysed by the activating metal and then thereafter by the silver layer forming. The silver deposition becomes autocatalytic. Not to be restricted by any one model it is believed that clusters of metal atoms are required to catalyse the silver reduction. Single atoms may not be adequate.

The isotropic conductive adhesive may comprise a mixture of silver coated polymer beads and adhesive matrix with the polymer beads forming 20-60% of the mixture, by volume. The polymer beads may form 25-55% or 45-50% of the volume of the mixture by volume. The percolation threshold for spheres is typically between 30-40% by volume and hence it may exceed this threshold value. The percolation threshold in this context is a mathematical value for the threshold above which, in a random system, a fully interconnected network will be formed, in this case a network of beads forming an isotropically conductive network. If the amount of polymer beads is too low then the conductivity of the adhesive will be reduced. Conversely, if too many beads are included then the mechanical properties of the cured adhesive can be adversely affected. For thin films of adhesive conductivity will be obtained at lower volume fractions. At a volume fraction of about 17% one can say that conductivity in the X and Y directions essentially falls to zero and the adhesive becomes anisotropic. Discussion of the effect of volume fraction on conductivity can be found in US 2009/0288697.

The volume of beads in the mixture may be increased beyond 60% when multiple sizes of beads are used, for example a mixture of two diameters of beads selected so that the smaller beads will occupy the gaps left between the larger beads.

The adhesive matrix is typically based on a thermosetting resin such as, but not limited by, an epoxy resin, a cross linkable polyurethane, a silicone, a cyano-acrylate or a thermoplastic material as exemplified by ethylene vinyl acetate or linear polyurethane. The adhesive matrix may be a heat curing adhesive or an adhesive cured by UV or visible light. A heat curing adhesive matrix however may be preferred. It may be preferred that an adhesive is used that can be processed at temperatures less than 180° C., typically around 150° C. Adhesives that can be processed at lower temperatures, even room temperature curing adhesive, may also be used.

The polymer beads can comprise any suitable polymer material. Exemplary materials are styrenics, acrylates and methacrylate, vinyl polymers and condensation polymers including polyesters, epoxy resins, phenol-aldehyde polymers and polyurethanes. Particles may be produced by any method including emulsion polymerisation, suspension polymerisation, or dispersion polymerisation. Narrow size distributions may be obtained by using seeded polymerisations as described in U.S. Pat. No. 4,336,173, U.S. Pat. No. 4,459,378, U.S. Pat. No. 6,291,553, DE 19634393, and U.S. Pat. No. 6,346,592. Membrane, capillary techniques or any other method known to one skilled in the art may also be used.

The polymer beads may, for example, be prepared from styrene, e.g. styrene crosslinked with divinylbenzene. Other styrene monomers of use may include methylstyrene and vinyl toluene. Mixtures of styrene monomers may be used. Another option is polymer beads prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above. All monomers can be crosslinked with divinylbenzene or a diacrylic monomer such as ethanediol-diacrylate. Some seeds may require treatment with base to hydrolyse ester groups to allow cross-linking. The use of a cross-linking agent and hence the formation of a crosslinked seed may be preferred.

Still another method for preparing polymer beads involves copolymerization of mixed anhydrides such as acrylic acid-acetic acid anhydride, or maleic and/or fumaric anhydride with styrene, and a small amount of divinylbenzene, and finally hydrolyzing the product. Some seed monomers may comprise epoxy groups such as glycidol methacrylate. The skilled man is able to select the monomer combination and cross-linker he wants using his general knowledge.

Exemplary polymer beads comprise a styrene, an acrylate or a methacrylate. Exemplary monomers therefore include styrene, acrylic acid, butyl acrylate, 2-ethylhexyl acrylate, methyl acrylate, ethyl acrylate, acrylonitrile, divinylbenzene, methyl methacrylate, ethyleneglycol diacrylate hexanediol diacrylate and trimethylolpropane triacrylate (TMPTA). The isotropic conductive adhesive may be used in any appropriate manner, for example by depositing or spreading the adhesive on surfaces of one or both of two parts in order to make a connection between the two parts. In some exemplary embodiments, the isotropic conductive adhesive takes the form of an isotropic conductive film and hence comprises a film substrate layer with a layer or coating of the mixture of conductive beads and adhesive matrix deposited on the film substrate layer. The film substrate layer may be a plastic film, for example a polymer film such as a polypropylene film.

Another exemplary embodiment provides a method of manufacturing an isotropic conductive adhesive, the method comprises: combining silver coated polymer beads with an adhesive matrix, wherein the mean average diameter of the beads is less than 30 μm and wherein the silver coating comprises interlinked silver deposits grown from dispersed nucleation sites scattered across the surface of the beads.

The polymer beads may have features as described above in relation to features of the first aspect, for example in connection with the mean average diameter of the beads and the thickness of the silver coating.

The method may comprise the use of polymer beads sourced from an appropriate manufacturer. The beads may comprise a material or materials as described above.

In exemplary embodiments the method includes a step of coating of polymer cores with silver to form the silver coated polymer beads. The coating step may comprise applying silver to coat the beads with at least 80% coverage of the surface, or complete coverage.

Silver may be deposited on small polymer particles by a number of methods. The most applicable are the methods collectively called electroless-plating and the method hence may comprise applying the silver via electroless-plating. In an example coating process, catalytic quantities of metals atoms illustrated by but not restricted to palladium, platinum or silver are distributed evenly over the surface of the polymer core. This may be achieved by methods including vapour deposition, impregnation with a salt of the metal followed by reduction to the metallic state or by sensitisation by acidic tin chloride followed by a salt such as palladium chloride. The methods are numerous and well known to one skilled in the art. Silver may then be deposited by the reduction of silver ions from a soluble salt such as silver nitrate or silver sulphate. This reaction may be performed with a number of reducing agents illustrated by but not restricted to hydrazine, dimethyl ammonium borane, sugars such as glucose and fructose or ascorbic acid. In this example process silver deposition is initially catalysed by the activating metal and then thereafter by the silver layer forming. The silver deposition becomes autocatalytic. Not to be restricted by any one model it is believed that clusters of metal atoms are required to catalyse the silver reduction. Single atoms are not believed to be adequate.

The isotropic conductive adhesive may comprise a mixture of silver coated polymer beads and adhesive matrix with features as described above in connection with the first aspect. The method may comprise mixing of a two component epoxy to form the adhesive matrix, and then mixing the coated polymer beads into the matrix.

The method may include applying the combination of conductive beads and adhesive matrix to a film substrate layer in order to form an isotropic conductive film. The film substrate layer may be as described above.

Another exemplary embodiment extends to use of an isotropic conductive adhesive for conductive and mechanical interconnection of two parts, the isotropic conductive adhesive being as described above in relation to the first aspect and features thereof.

The isotropic conductive adhesive may be applied to one or both contact surfaces of the two parts, either in a continuous bead or discontinuously. There may be a curing step, for example heat curing or curing using UV and/or visible light. The curing step may comprise heat curing. The isotropic conductive adhesive may be provided in the form of an isotropic conductive film, which can be used in a similar fashion to existing conductive film adhesive products.

Figure 2:
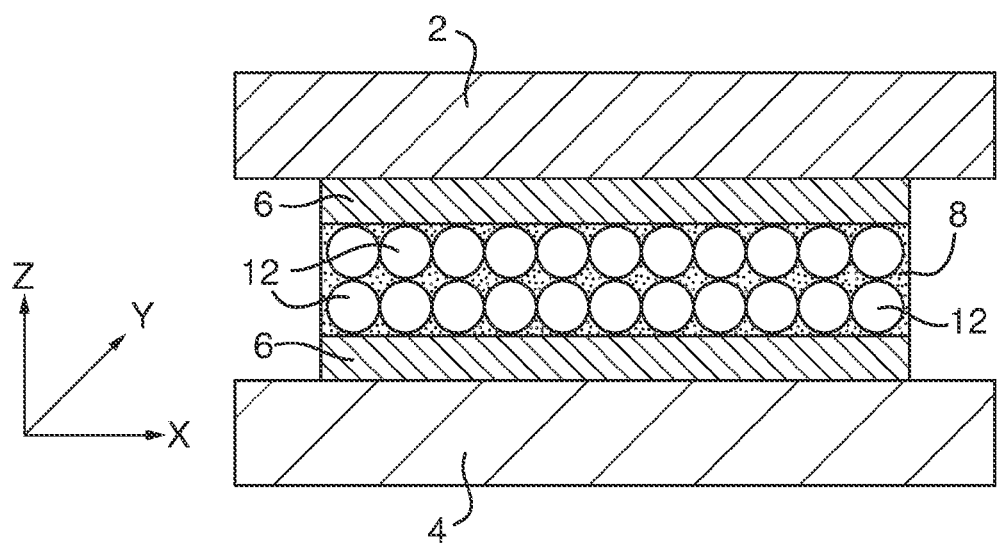
FIG. 2 is a similar schematic drawing showing an isotropic conductive adhesive using silver coated polymer beads.

One exemplary embodiment concerns an isotropic conductive adhesive (ICA) of the type shown in FIG. 2. As with the ICA of FIG. 1 the ICA of FIG. 2 connects a component 2 to a substrate 4. Both of the component 2 and substrate 4 have an electrical contact 6. The ICA comprises an adhesive matrix 8 and silver coated polymer beads 12. In practice the beads 12 would generally not be aligned perfectly as shown in the Figure. Instead the beads 12 can be located almost randomly during flow of the ICA onto the contact(s) 6. The volume fraction of beads 12 in the mixture of beads 12 and adhesive matrix is set so as to ensure that an isotropically conductive network of beads 12 is formed. Typically this will require in excess of 30% of beads and more than 40% of beads, by volume. Examples are given below.

The silver coating provides the required conductivity for the ICA. The adhesive matrix, when cured, provides the strength for the joint between the two parts. The polymer cores of the beads 12 provides a high and also controllable degree of flexibility of the adhesive by allowing the selection of suitable polymer compositions with adjusted mechanical properties that can be matched with the mechanical properties of the adhesive matrix. Since the silver layer on the polymer bead is relatively thin then the coated bead has mechanical properties highly influenced by the polymer core. This allows, for instance, the coefficient of thermal expansion (CTE) and the elastic modulus of the conductive fillers to be much better matched to those of the epoxy resin in contrast to what is possible when loading the adhesive with the solid metal particles. Thereby the local stress concentrated at the interfaces between the conductive fillers and the resin can be reduced. Possible combinations of materials for the adhesive matrix and polymer beads are given in the examples below.

The polymer beads in the exemplary embodiments are produced by emulsion, suspension or dispersion polymerisation, or in order to produce smaller polydispersity, by a seeded polymerisation.

The silver coating is added by electroless-plating. An example process is described in Example 1 below. Other suitable plating methods may be used in alternative embodiments.

An example of a process for manufacturing of isotropic conductive adhesives based on silver coated polymer particles is set out in Example 2.

Examples 3.1 to 3.9 illustrate possible combinations of particle diameter and silver thickness for beads produced by routine adaptation of the method of Example 1. The particle diameter is the mean average diameter of the polymer core and the silver thickness is the average thickness as measured using the technique described above. Measured conductivity values are also included for conductive adhesives using a selection of the coated beads of Examples 3.1 to 3.9, where the conductive adhesives are produced using the process of Example 2.

Example 4 describes manufacturing of an isotropic conductive film. Example 5 relates to a use of the adhesives of the prior examples and Example 6 concerns poly-modal products with combinations of particle sizes.

Advantageously, as well as providing electrical conductivity the adhesives described herein also provide improvements in thermal conductivity. In the discussion above the term 'conductive' is used to reference electrical conductivity, but it should be understood that the conductive adhesives may also be thermally conductive adhesives having a thermal conductance greater than that of the adhesive matrix. This has advantages in terms of spreading heat to dissipate heat from heat generating components into a substrate, or vice versa, as well as avoiding stresses that may result from differential temperatures across an adhesively coupled joint.

Example 1

In a first example 50 g polymer particles comprised of a copolymer of methylmethacrylate and ethyleneglycol dimethacrylate with average diameter of 15 μms were soaked in 150 ml a solution of $SnCl_2$ (20 g/l $SnCl_2$ 30 g/l Concentrated HCl) at room temperature for 30 minutes. The particles were washed and then soaked in 150 ml Palladium Chloride solution (0.2 g/l PdCl2 for 30 minutes). The particles were then coated with silver from a solution of silver nitrate and triethylene tetramine ($AgNO_3$ 44.9 g TETA 83 g) reduced by ascorbic acid (90 g) at 40° C. The product was washed and dried. The product was a free flowing grey powder with a theoretical average silver thickness of 150 nm.

Example 2

One production method used to make isotropic conductive adhesives based on silver coated polymer particles is as below. In this example the adhesive is applied to a test board. The application process can be adapted using routine techniques to apply the adhesive to fix any desired component(s).

i. Mix the selected epoxy system by mixing part A and part B in accordance with the technical data sheet. EPO-TEK 353ND from Epoxy Technology is used for the adhesives of Example 3.
ii. Add a predetermined weight particles to the mixed epoxy system. The weight of particles is selected to achieve the required volume % of filler in final isotropic adhesive system.
iii. Speed mix the adhesive in 20 ml containers at 2000 rpm for 2 min
iv. Apply the adhesive to a PCB board designed to test four point resistance, using a stencil with width of openings equal to 2 mm and thickness equal to 150 μm, and using a razor blade to fill the openings in the stencil.
v. Cure the samples for 15 min at 150 degrees Celsius.
vi. Cool the sample to Room Temperature.
vii. Measure the four point resistance with a Keithley 3706 Multimeter to test the conductivity.

Examples 3.1 to 3.9

With different diameters for the starting particles and using a scaled version of method 1 compensating for surface area and desired metal thickness then various combinations of diameter and silver thickness can be produced. The combinations of values in the table below are examples of appropriate combinations for isotropic adhesive products.

|  | Particle diameter | Silver thickness |
|---|---|---|
| Example 3.1 | 6 μm | 100 nm |
| Example 3.2 | 6 μm | 150 nm |
| Example 3.3 | 10 μm | 100 nm |
| Example 3.4 | 10 μm | 150 nm |
| Example 3.5 | 15 μm | 100 nm |
| Example 3.6 | 15 μm | 150 nm |
| Example 3.7 | 20 μm | 150 nm |
| Example 3.8 | 20 μm | 200 nm |
| Example 3.9 | 10 μm | 220 nm |

Certain coated particles from the examples above were incorporated into an adhesive product using the process of Example 2 with volumes of particles as set out in the table below, which also provides measurements for the conductivity of the adhesive. It should be noted that for Examples 3.5 and 3.9 the measured values relate to the use of a different epoxy mix, with the EPO-TEK 353ND referenced above being replaced by Araldite PY302-2 mixed with JEFFAMINE D-230 at weight ratio 100:35 (both available from HUNTSMAN)

| Particle from; | Vol % in EPO-TEK 353ND | Bulk Conductivity |
|---|---|---|
| Example 3.1 | 40 Vol % | 400 (Ωcm)$^{-1}$ |
| Example 3.2 | 50 Vol % | 1300 (Ωcm)$^{-1}$ |
| Example 3.4 | 35 Vol % | 10 (Ωcm)$^{-1}$ |
| Example 3.4 | 45 Vol % | 550 (Ωcm)$^{-1}$ |
| Example 3.4 | 50 Vol % | 700 (Ωcm)$^{-1}$ |
| Example 3.5 | 48 Vol % | 1350 (Ωcm)$^{-1}$ |
| Example 3.9 | 51 Vol % | 1750 (Ωcm)$^{-1}$ |
| Example 3.9 | 42 Vol % | 1050 (Ωcm)$^{-1}$ |
| Example 3.9 | 40 Vol % | 450 (Ωcm)$^{-1}$ |

In an alternative to the method of Example 2 the polymer particles could be introduced prior to or simultaneously with the step of mixing of the epoxy system. For example, the particles could be mixed in the separate epoxy components (or one of the two components) followed by mixing the epoxy compounds together.

Example 4

One production method used to make a film of the isotropic conductive adhesive based on silver coated polymer particles is as below. In this example the adhesive is applied to a test slide. The application process can be adapted using routine techniques to apply the adhesive to fix any desired component (s).
i. Mix the components of selected resin system into a resin mix. Resin mix used in this example contained 70 weight parts EPIKOTE 1002 and 30 weight parts NIPOL 1072. (EPIKOTE 1002 is available from Momentive Specialty Chemical Inc., and NIPOL 1072 is available from Zeon Chemicals), made into a 40% solution in toluene.
ii. Add 20% by volume NOVACURE, a latent curing agent for epoxy resin (NOVACURE is available from Asahi Kasei E-Materials)
iii. Speed mix the mixture at 1500 rpm for 5 minutes
iv. Add a predetermined weight of particles to the mixed adhesive for the film system. The weight of particles is selected to achieve the required volume % of filler in final isotropic adhesive film. The particles may, for example, have sizes and coating thicknesses as in Examples 3.1 to 3.9.
v. Speed mix the mixture at 1500 rpm for 5 minutes
vi. Coat a biaxial stretched polypropylene film using a 50 μm blade applicator with the above mentioned adhesive film mixture.

Drying at 90 degrees Celsius for 15 minutes results in an isotropic conductive adhesive film material having a thickness of approximately 25 μm.

Example 5

The isotropic conductive adhesive, as described in any of Examples 1-4, being used as electrical interconnection in solar module manufacturing. In this example the conductive adhesive replaces solder in silicon based solar modules, and offers an affordable alternative to silver flake adhesives for thin film solar modules.

Example 6

A poly-modal isotropic conductive adhesive, can be obtained by the use of two or more particle sizes, for example by combinations of two or more particle sizes as described in any of examples 3.1 to 3.9. An example of a poly-modal product comprises 40 vol % particles mixed with 60 vol % adhesive matrix, which may for example be EPO-TEK 353ND. The 40 vol % of particles is, for example, divided into 10% of 6 μm diameter (4% of the isotropic conductive adhesive) 30% of 10 μm diameter (12% of the isotropic conductive adhesive) and 60% of 15 μm diameter (24% of the isotropic conductive adhesive).

The present invention is disclosed above and in the accompanying drawings with reference to a variety of embodiments. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims.

What is claimed is:

1. An isotropic conductive adhesive comprising silver coated polymer beads within an adhesive matrix, wherein the volume fraction of silver is 1.9% to 6.8% by volume of the isotropic conductive adhesive, wherein an isotropically conductive network within the adhesive matrix consists of the silver coated polymer beads, wherein the mean average diameter of the polymer cores of the beads is less than 30 μm; wherein the silver coating comprises interlinked silver deposits grown from dispersed nucleation sites scattered across the surface of the beads, the dispersed nucleation sites being provided by catalytic quantities of metal atoms on the surface of the polymer cores; and wherein there is no metal seed layer between the polymer core and the silver coating.

2. The isotropic conductive adhesive of claim 1, wherein the mean average diameter of the polymer cores of the beads is 25 μm or lower.

3. The isotropic conductive adhesive of claim 1, wherein the polymer cores of the beads have a coefficient of variation (CV) in diameter of less than 5%.

4. The isotropic conductive adhesive of claim 1, wherein the polymer cores of the beads have a coefficient of variation (CV) in diameter of less than 3%.

5. The isotropic conductive adhesive of claim 1, wherein the average thickness of the silver is 350 nm or less.

6. The isotropic conductive adhesive of claim 5, wherein the average thickness of the silver is less than 3% of the diameter of the polymer core of the bead.

7. The isotropic conductive adhesive of claim 1, wherein the average thickness of the silver is less than 5% of the diameter of the polymer core of the bead.

8. The isotropic conductive adhesive of claim 1, wherein the average thickness of the silver is less than 3% of the diameter of the polymer core of the bead.

9. The isotropic conductive adhesive of claim 1, comprising a mixture of silver coated polymer beads and adhesive matrix with the polymer beads forming 20-60% of the mixture, by volume.

10. The isotropic conductive adhesive of claim 1, comprising a mixture of silver coated polymer beads and adhesive matrix with the polymer beads forming 25-50% of the mixture, by volume.

11. An isotropic conductive adhesive comprising silver coated polymer beads within an adhesive matrix, wherein the volume fraction of silver is 1.9% to 6.8% by volume of the isotropic conductive adhesive, wherein an isotropically conductive network within the adhesive matrix consists of the silver coated polymer beads, wherein the mean average diameter of the polymer cores of the beads is at least 2 µm and less than 30 µm; wherein the silver coating has an average thickness of more than 50 nm, less than 350 nm, and less than 4% of the diameter of the beads; wherein the silver coating comprises interlinked silver deposits grown from dispersed nucleation sites scattered across the surface of the beads, the dispersed nucleation sites being provided by catalytic quantities of metal atoms on the surface of the polymer cores; and wherein there is no metal seed layer between the polymer core and the silver coating.

12. The isotropic conductive adhesive of claim 11, wherein the silver coated polymer beads with an adhesive matrix comprise the polymer beads forming 20-60% of the mixture, by volume.

13. The isotropic conductive adhesive of claim 11, wherein the mean average diameter of the polymer cores of the beads is at least 6 µm and less than 30 µm.

14. An isotropic conductive adhesive comprising silver coated polymer beads within an adhesive matrix, wherein the volume fraction of silver is above 0.2% to 6.8% by volume of the isotropic conductive adhesive, wherein the mean average diameter of the polymer cores of the beads is less than 30 µm; wherein the silver coating comprises interlinked silver deposits grown from dispersed nucleation sites scattered across the surface of the beads, the dispersed nucleation sites being provided by catalytic quantities of metal atoms on the surface of the polymer cores; and wherein there is no metal seed layer between the polymer core and the silver coating.

15. The isotropic conductive adhesive of claim 14 wherein the volume fraction of silver is 1.9% to 6.8% by volume of the isotropic conductive adhesive.

16. A method of making an isotropic conductive adhesive comprising: combining silver coated polymer beads with an adhesive matrix to form an isotropically conductive network within the adhesive matrix such that the isotropically conductive network within the adhesive matrix consists of the silver coated polymer beads, wherein the volume fraction of silver is 1.9% to 6.8% by volume of the isotropic conductive adhesive, wherein the mean average diameter of the beads is less than 30 µm; wherein the silver coating comprises interlinked silver deposits grown from dispersed nucleation sites scattered across the surface of the beads, the dispersed nucleation sites being provided by catalytic quantities of metal atoms on the surface of the polymer cores; and wherein there is no metal seed layer between the polymer core and the silver coating.

17. The method of claim 16, wherein the silver coated polymer beads and adhesive matrix are combined with the polymer beads forming 25-50% of the mixture, by volume.

18. An assembly comprising an isotropic conductive adhesive positioned between a component and a substrate such that the isotropic conductive adhesive provides conductive and mechanical interconnection of the component and the substrate, the isotropic conductive adhesive comprising: silver coated polymer beads within an adhesive matrix, wherein the volume fraction of silver is 1.9% to 6.8% by volume of the isotropic conductive adhesive, wherein an isotropically conductive network within the adhesive matrix consists of the silver coated polymer beads, wherein the mean average diameter of the polymer cores of the beads is less than 30 µm; wherein the silver coating comprises interlinked silver deposits grown from dispersed nucleation sites scattered across the surface of the beads, the dispersed nucleation sites being provided by catalytic quantities of metal atoms on the surface of the polymer cores; and wherein there is no metal seed layer between the polymer core and the silver coating.

* * * * *